United States Patent
Meng et al.

(10) Patent No.: US 10,844,663 B2
(45) Date of Patent: Nov. 24, 2020

(54) FIBER REINFORCED ELASTOMERIC STATOR

(71) Applicant: Smith International, Inc., Houston, TX (US)

(72) Inventors: Scott Meng, Katy, TX (US); Peter Thomas Cariveau, Houston, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 0 days.

(21) Appl. No.: 15/468,204

(22) Filed: Mar. 24, 2017

(65) Prior Publication Data

US 2017/0204665 A1 Jul. 20, 2017

Related U.S. Application Data

(62) Division of application No. 14/380,329, filed as application No. PCT/US2013/027098 on Feb. 21, 2013.

(60) Provisional application No. 61/601,445, filed on Feb. 21, 2012.

(51) Int. Cl.

| E21B 4/02 | (2006.01) |
|---|---|
| F04C 13/00 | (2006.01) |
| F04C 2/107 | (2006.01) |
| C08L 9/02 | (2006.01) |
| H02K 1/12 | (2006.01) |
| H02K 15/02 | (2006.01) |
| B29C 45/00 | (2006.01) |
| C08K 7/02 | (2006.01) |
| F03C 2/08 | (2006.01) |
| B29L 31/00 | (2006.01) |

(52) U.S. Cl.
CPC ............ *E21B 4/02* (2013.01); *B29C 45/0001* (2013.01); *B29C 45/0053* (2013.01); *C08K 7/02* (2013.01); *C08L 9/02* (2013.01); *F03C 2/08* (2013.01); *F04C 2/1075* (2013.01); *F04C 13/008* (2013.01); *H02K 1/12* (2013.01); *H02K 15/02* (2013.01); *B29L 2031/749* (2013.01); *C08L 2205/16* (2013.01); *F05C 2253/04* (2013.01); *Y10T 29/49009* (2015.01)

(58) Field of Classification Search
CPC ... E21B 4/02; B29C 45/0001; B29C 45/0053; C08K 7/02; C08L 9/02; C08L 2205/16; F03C 2/08; F04C 13/008; F04C 2/1075; H02K 15/02; H02K 1/12; F05C 2253/749; Y10T 29/49009
USPC ....................................................... 524/493
See application file for complete search history.

(56) References Cited

U.S. PATENT DOCUMENTS

| 4,991,292 | A | 2/1991 | Bostel |
| 5,349,020 | A | 9/1994 | Okada et al. |
| 5,759,019 | A | 6/1998 | Wood et al. |
| 6,102,681 | A | 8/2000 | Turner |
| 6,183,226 | B1 | 2/2001 | Wood et al. |
| 6,336,796 | B1 | 1/2002 | Cholet et al. |
| 6,417,271 | B1 | 7/2002 | Nishihara et al. |
| 6,604,921 | B1 | 8/2003 | Plop et al. |
| 6,604,922 | B1 * | 8/2003 | Hache .................. B29C 70/086 418/153 |
| 6,905,319 | B2 | 6/2005 | Guo |
| 7,083,401 | B2 | 8/2006 | Hooper |
| 7,517,202 | B2 | 4/2009 | Delpassand |
| 7,594,541 | B2 | 9/2009 | Ciglenec et al. |
| 7,696,275 | B2 | 4/2010 | Slay et al. |
| 7,739,792 | B2 | 6/2010 | Lee et al. |
| 7,868,082 | B2 | 1/2011 | Ellul et al. |
| 7,950,914 | B2 | 5/2011 | Hooper et al. |
| 2002/0084029 | A1 | 7/2002 | Turner et al. |
| 2003/0192184 | A1 | 10/2003 | Hache |
| 2005/0089429 | A1 | 4/2005 | Delpassand et al. |
| 2006/0131079 | A1 | 6/2006 | Bottos |
| 2006/0153724 | A1 | 7/2006 | Delpassand |
| 2007/0241480 | A1 | 10/2007 | Kanenari et al. |
| 2009/0152009 | A1 | 6/2009 | Slay et al. |
| 2009/0169404 | A1 | 7/2009 | Sindt et al. |
| 2010/0086425 | A1 | 4/2010 | Steele |
| 2010/0098569 | A1 | 4/2010 | Robisson et al. |
| 2011/0034619 | A1 | 2/2011 | Schweitzer et al. |
| 2011/0116959 | A1 | 5/2011 | Akbari et al. |
| 2011/0116960 | A1 | 5/2011 | Akbari et al. |
| 2011/0116961 | A1 | 5/2011 | Akbari et al. |
| 2011/0156357 | A1 * | 6/2011 | Noguchi ............... C09K 3/1009 277/336 |
| 2011/0271527 | A1 | 11/2011 | Lee et al. |
| 2012/0148432 | A1 | 6/2012 | Butuc et al. |

FOREIGN PATENT DOCUMENTS

| EP | 894195 A1 | 2/1999 |
| EP | 1406016 A1 | 4/2004 |
| EP | 1892416 A1 | 2/2008 |

(Continued)

OTHER PUBLICATIONS

International Preliminary Report on Patentability issued in corresponding International Application PCT/US2013/027098 dated Sep. 4, 2014. 11 pages.
International Search Report and Written Opinion issued in corresponding International Application PCT/US2013/027098 dated Jun. 12, 2013. 17 pages.
Extended Search Report issued in corresponding European Application 13751460.0 dated Apr. 22, 2016. 6 pages.
First Office Action and Search Report issued in corresponding Chinese application 201380020416.3 dated Apr. 5, 2016. English translation with Chinese report. 24 pages.

(Continued)

*Primary Examiner* — Angela C Scott

(57) ABSTRACT

Embodiments disclosed herein relate to a composition useful for forming a stator or a portion thereof. The composition may include: a curable elastomer; a fiber or fibrous compound; a fiber dispersion compound; and optionally carbon black.

16 Claims, 6 Drawing Sheets

(56) References Cited

FOREIGN PATENT DOCUMENTS

WO      9105939 A1    5/1991

OTHER PUBLICATIONS

Second Office Action issued in corresponding Chinese application 201380020416.3 dated Dec. 13, 2016. English translation with Chinese report. 21 pages.
Office Action issued in corresponding Russian application 2014138063 dated Jan. 17, 2017. English translation with Russian report. 8 pages.
Brown et al. Slurry handling: design of solid-liquid systems. Eslseiver Science Publishers. Essex, England 1991. 7 pages.
Chang-Bin et al. Anti-corrosion property of carbon fiber reinforced rubber composite. School of Materials Science and Engineering, Yanshan University, Qinhuangdao 066004, China English Abstract.
Wang et al. Stator rubber of the screw pump and its property improvement. College of Materials Science & Engineering,Southwest Petroleum Institute,Chengdu 610500;Ding Ruie College of Materials Science & Engineering, Shandong University of Technology, Zibo 255049 English Abstract.
Kubena et al. Performance characteristics of drilling equipment elastomers evaluated in various drilling fluids. Spe-21960. SPE/IADC Drilling Conference, Mar. 11-14, 1991, Amsterdam, Netherlands.
Dumas et al, New Methods to AnalyseFragmentation Mechanisms of Precipitated Silicas, Research Gate I 5th Int. Workshop on Granulation, Granulation Cone, Aug. 22, 2011 (Aug. 22, 2011), pp. 1-10, lausanne, Switzerland.
Dumas et al, New Methods to AnalyseFragmentation Mechanisms of Precipitated Silicas, Research Gate I 5th Int. Workshop on Granulation, Granulation Conf., Aug. 22, 2011 (Aug. 22, 2011), pp. 1-10, Lausanne, Switzerland.
Search and Examination report issued in European patent application 13751460.0 dated Feb. 13, 2020, 4 pages.

\* cited by examiner

FIBER REINFORCED ELASTOMERIC STATOR

CROSS REFERENCE TO RELATED APPLICATIONS

This application is a Divisional Application of U.S. application Ser. No. 14/380,329, entered on Aug. 21, 2014, which is a U.S. National Stage Application of PCT Application No. PCT/US/2013/027098, filed on Feb. 21, 2013, which claims priority to and the benefit of U.S. Provisional Application No. 61/601,445, filed on Feb. 21, 2012, the entirety of each of which is incorporated herein by reference.

FIELD OF THE DISCLOSURE

Embodiments disclosed herein relate generally to stators used with positive displacement drilling motors. More specifically, embodiments disclosed herein relate to a fiber reinforced stator, and compositions for forming the fiber reinforced stator, wherein the fiber is easily incorporated and well dispersed throughout the elastomeric matrix.

BACKGROUND

Moineau style hydraulic motors and pumps are conventional in subterranean drilling and artificial lift applications, such as for oil and/or gas exploration. Such motors make use of hydraulic power from drilling fluid to provide torque and rotary power, for example, to a drill bit assembly. While downhole drilling motors fall into the general category of Moineau-type motors, they are generally subject to greater working loads, temperatures, and more severe chemical and abrasive environments than Moineau motors and pumps used for other applications. As such, the demands on drilling motor components (rotor and stator components) typically far exceed the demands on the components of other Moineau-type motors and pumps. For example, drilling motors may be subject to a pressure drop (from top to bottom across the motor) of up to 1500 psi at temperatures of up to about 200° C. Furthermore, a conventional stator may exceed 25 feet in length. Achieving suitable processability (e.g., flowability) in order to injection mold the elastomer materials tends to be difficult at such lengths. Moreover, many rubber compounds are known to deteriorate in the presence of hydrocarbons.

The power section of a typical Moineau style motor includes a helical rotor disposed within the helical cavity of a corresponding stator. When viewed in circular cross section, a typical stator shows a plurality of lobes in the helical cavity. In most conventional Moineau style power sections, the rotor lobes and the stator lobes are preferably disposed in an interference fit, with the rotor including one fewer lobe than the stator. Thus, when fluid, such as a conventional drilling fluid, is passed through the helical spaces between rotor and stator, the flow of fluid causes the rotor to rotate relative to the stator (which may be coupled, for example, to a drill string). The rotor may be coupled, for example, through a universal connection and an output shaft to a drill bit assembly. Rotation of the rotor therefore causes rotation of the drill bit in a borehole.

One drawback with conventional stators including an all elastomer helical cavity component is that a tradeoff in elastomer properties has been required. One such tradeoff has been between the resilience (rigidity) of the elastomer and its processability (its flowability during injection molding). For example, U.S. Pat. No. 6,905,319 to Guo states:

"processability is generally inversely related to the stiffness of the rubber. This is particularly true in injection-mold processes . . . . Typically, a stiffer compound will demand much more processing power and time, thereby increasing manufacturing costs" (column 4, lines 4-12). Despite the potential advantages of using a stiffer elastomer, Guo discloses an elastomer having a hardness of about 74 on the Shore A scale (ASTM D2240). Guo's teaching is consistent with conventional wisdom in the art, which suggests that rigid elastomers (e.g., those having a Shore A hardness of about 90 as well as other mechanical properties described in more detail below) are not suitable for use in downhole stators due to inherently poor processability. The elastomeric materials in conventional stators typically have a hardness (Shore A) in the range from 65-75.

One significant drawback with conventional stators is that the elastomer helical cavity component deforms under torque loads (due to the low rigidity of the elastomer). This deformation creates a gap on the unloaded side of the stator lobe, thereby allowing drilling fluid to pass from one cavity to the next without producing any work (i.e., without causing rotation of the rotor). This is known in the art as "RPM drop-off." When the torque reaches a critical level, substantially all of the drilling fluid bypasses the stator lobes and the rotor stalls. Thus, flexibility of the liner may lead to incomplete sealing between the rotor and stator such that available torque may be lost when the rotor compresses the stator lobe material, thereby reducing the power output of the PDM.

Additional problems may be encountered with stators when, for example, rotation of the rotor within the stator shears off portions of the stator lobes. This process, which may be referred to as "chunking," deteriorates the seal formed between the rotor and stator and may cause failure of the PDM. Chunking may be increased by swelling of the liner or thermal fatigue. Swelling and thermal fatigue may be caused by elevated temperatures and exposure to certain drilling fluids and formation fluids, among other factors.

Various attempts have been made to increase stator durability and heat conduction properties. For example, U.S. Pat. No. 6,102,681, issued to Turner, describes fibers disposed in an elastomer material that forms a stator of a helicoidal pump or motor. The fibers are arranged to form a two or three dimensional structure within the elastomer material. The fibers are either coated with the elastomer material as they are being woven to form a fabric layer or are formed into the desired arrangement to form a fiber skeleton. After the fiber skeleton is formed, elastomer is then injected into the stator under heat and pressure to complete the process. Other processes for forming a stator having a fiber reinforced layer may include one or more of U.S. Pat. Nos. 7,950,914, 7,739,792, 7,517,202, 7,083,401; 6,604,921, 6,183,226, 5,759,019, US20090169404, US20110116959, US20110116960, US20110116961, and US20030192184, among others.

Fiber reinforcement, to date, has presented significant manufacturing difficulties as it is difficult to achieve desired stator properties using injection molding techniques, such as due to due to fiber settling or agglomeration, poor dispersion of the fiber throughout the elastomeric matrix, excessive viscosity of the elastomeric composition when incorporating the fibers (i.e., poor processability or a very limited processing window unsuitable for injection molding processes at the fiber loadings necessary to achieve the desired properties), among other shortcomings. The poor dispersion of the fiber via such processes impairs the elastomeric compound static and dynamic properties as well as performance consistency. As a result, fiber reinforcement via injection molding requires additional costly and labor-intensive manufacturing steps, such as weaving or placement of the fibers or a fibrous mat within or around a mold, and the manufacturing processes generally produce either a different concentration of fibers per unit volume of elastomer between the thick portions of the lobes and the thin portions (which reduces the mechanical strength of the liner) or, when fibers are disposed manually, a different number of layers must be applied in the thick portions of the lobes as compared to the thin portions. Due to the aforementioned reasons, fiber reinforced elastomeric stators have not been commercially successful.

SUMMARY OF THE DISCLOSURE

A novel method has now been developed to disperse aramid fibers or other fibers into an elastomeric matrix via injection molding or extrusion molding, overcoming one or more of the above noted deficiencies. It has been found that improved processablity and dispersion of fibers throughout an elastomeric matrix may be achieved by admixing fibers and a fiber dispersion compound, such as amorphous silicon dioxide, with an elastomeric material. It is theorized, for example, that the highly spherical geometry of the amorphous silicon dioxide provides a physical bearing effect, and as a result, the processability of the admixture and incorporation of a limited amount of the fiber and interaction of the fiber with the elastomeric matrix are greatly improved.

In one aspect, embodiments disclosed herein relate to a composition useful for forming a stator or a portion thereof. The composition may include: a curable elastomer; a fiber; a fiber dispersion compound; and carbon black. The composition may include from about 0.5 to about 1.8 phr fiber, where phr is defined as parts per hundred parts curable elastomer In another aspect, embodiments disclosed herein relate to a method of forming a stator or a portion thereof, the process including: admixing a curable elastomer, from about 0.5 to about 1.8 phr fiber, a fiber dispersion compound; and carbon black to form a curable composition; disposing the curable composition in a mold; curing the curable composition to form a stator liner or portion thereof.

In another aspect, embodiments disclosed herein relate to a stator useful in positive displacement drilling motors, the stator including: a stator liner comprising at least one elastomeric layer comprising a curable composition comprising: a curable elastomer, from about 0.5 to about 1.8 phr fiber, a fiber dispersion compound; and carbon black, or a reaction product thereof.

In another aspect, embodiments disclosed herein relate to a drilling motor, comprising: a stator and a rotor, the rotor being configured to rotate eccentrically when a drilling fluid is passed through the motor; wherein the stator comprises a stator liner comprising at least one elastomeric layer comprising a curable composition comprising: a curable elastomer, from about 0.5 to about 1.8 phr fiber, a fiber dispersion compound; and carbon black, or a reaction product thereof.

In another aspect, embodiments disclosed herein relate to a drilling assembly, comprising: a drilling motor comprising a stator and a rotor configured to rotate eccentrically when a drilling fluid is passed through the motor, the stator and rotor each having a proximal end and a distal end, and wherein the stator comprises a stator liner comprising at least one elastomeric layer comprising a curable composition comprising: a curable elastomer, from about 0.5 to about 1.8 phr fiber, a fiber dispersion compound; and carbon black, or a reaction product thereof; a motor output shaft directly or indirectly coupled to the distal end of the rotor; and a drill bit directly or indirectly coupled to a distal end of the motor output shaft. In another aspect, embodiments disclosed herein relate to a method of drilling a wellbore through a subterranean formation, the method comprising passing a drilling fluid through the drilling assembly.

In another aspect, embodiments disclosed herein relate to a composition useful for forming a fiber reinforced elastomeric component useful in oilfield products, such as a seal or a stator liner, the composition comprising: a curable elastomer; from about 0.5 to about 1.8 phr fiber; and a fiber dispersion compound.

In another aspect, embodiments disclosed herein relate to a method of forming a fiber reinforced elastomeric component useful in oilfield products, such as a seal or a stator liner, comprising: admixing a curable elastomer, from about 0.5 to about 1.8 phr fiber, and a fiber dispersion compound to form a curable composition; disposing the curable composition in a mold; curing the curable composition to form the fiber reinforced elastomeric component. In another aspect, embodiments disclosed herein relate to a fiber reinforced elastomeric component, useful in oilfield products, comprising the curable composition or a reaction product thereof.

Other aspects and advantages will be apparent from the following description and the appended claims.

DETAILED DESCRIPTION

In one aspect, embodiments disclosed herein relate generally to stators used with positive displacement drilling motors. More specifically, embodiments disclosed herein relate to a fiber reinforced stator, and compositions for forming the fiber reinforced stator, wherein the fiber is easily incorporated and well dispersed throughout the elastomeric matrix.

Figure 1:
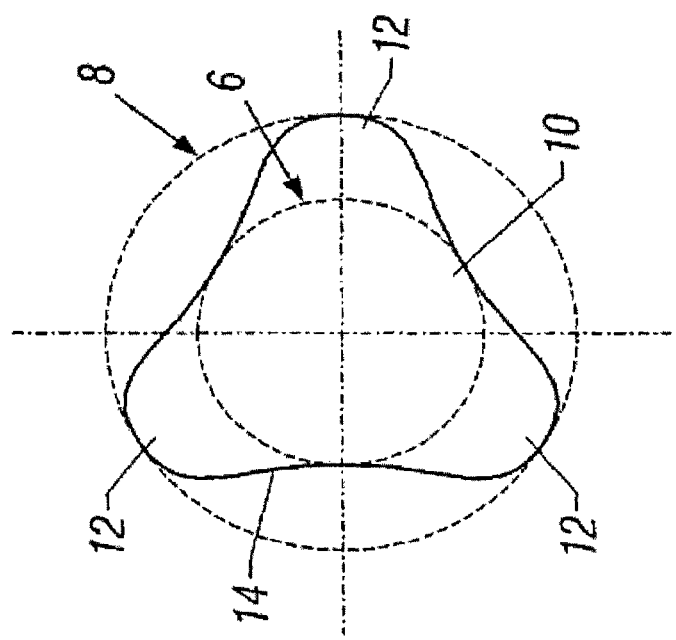
FIG. 1 shows a cross-sectional view of a rotor useful in mud motors according to embodiments disclosed herein.

Referring to FIG. 1, a typical rotor 10 includes at least one lobe 12 (wherein, for example, channels 14 are formed between lobes 12), a major diameter 8, and a minor diameter 6. The rotor 10 may be formed of metal or any other suitable material. The rotor 10 may also be coated to withstand harsh drilling environments experienced downhole.

Figure 2:
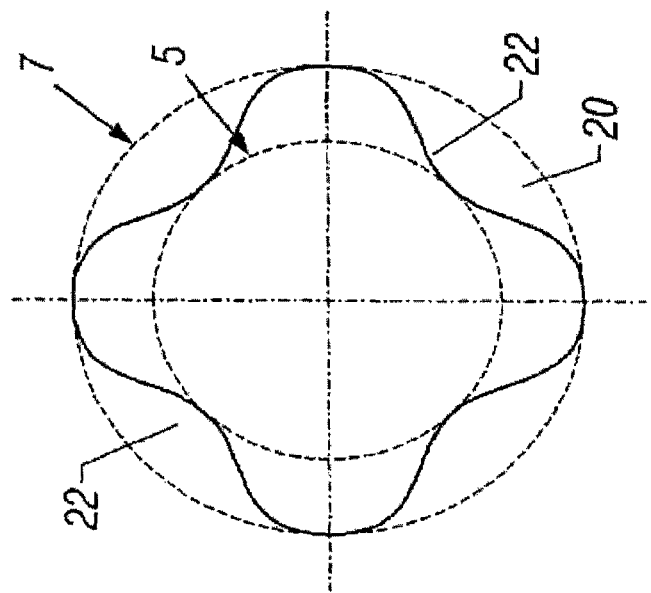
FIG. 2 shows a cross-sectional view of a stator according to embodiments disclosed herein.
Figure 3:
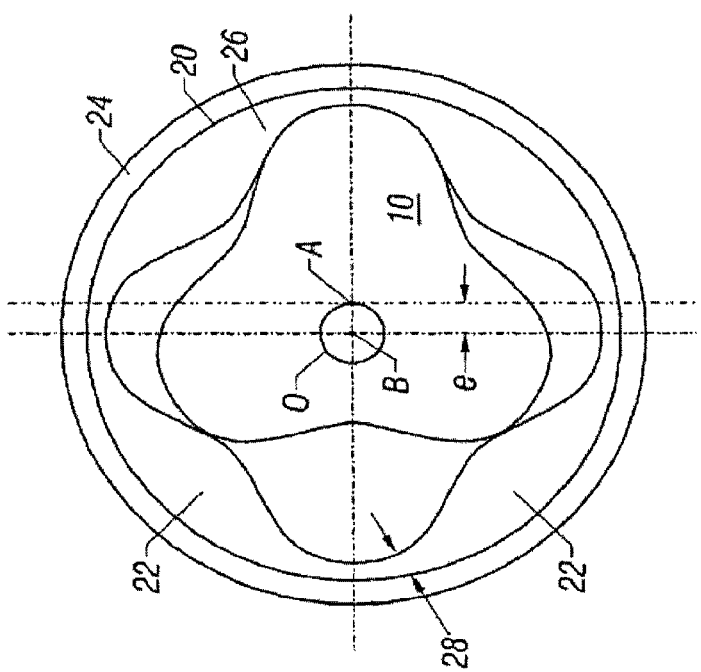
FIG. 3 shows a cross-sectional view of an assembled positive displacement motor according to embodiments disclosed herein.
Figure 5:
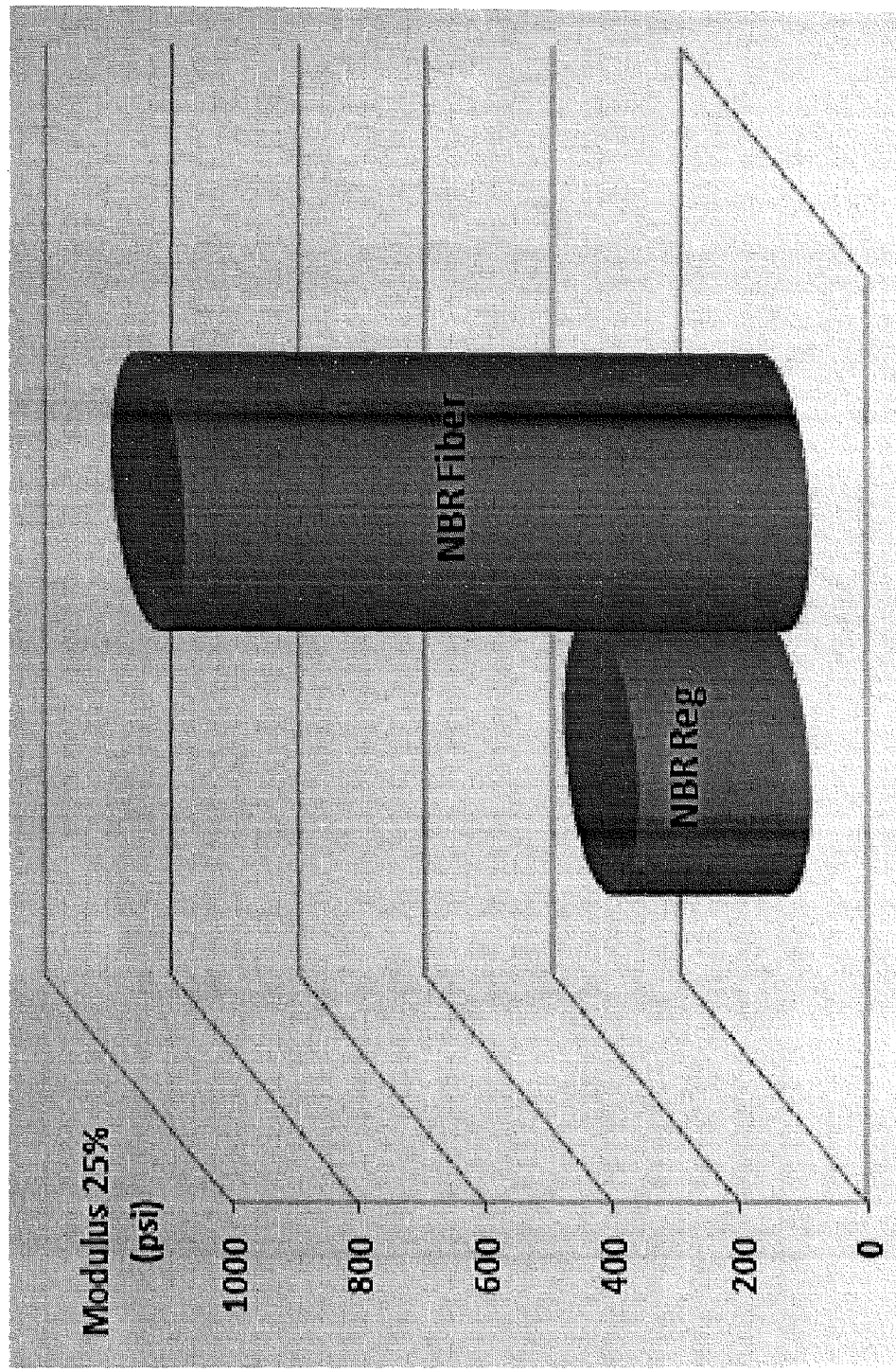
FIGS. 5-8 compare the physical properties of stators according to embodiments herein to stators without fiber.

Referring to FIG. 2, a stator 20 according to embodiments herein comprises at least two lobes 22, a major diameter 7, and a minor diameter 5. Rotor 10 (FIG. 1) typically includes "n" lobes, and the corresponding stator 20 used in combination with the rotor 10 generally includes either "n+1" or "n−1" lobes. Referring to FIG. 3, the stator 20 generally includes a cylindrical external tube 24 and a liner 26. The liner 26 is typically injected or extruded into the cylindrical external tube 24 around a mold (not shown) that has been placed therein. The liner 26 is then cured for a selected time at a selected temperature (or temperatures) before the mold (not shown) is removed. A thickness 28 of the liner 26 is generally controlled by changing the dimensions of the mold (not shown). A curing pressure, temperature, and time may be selected using means know in the art so as to completely cure the elastomer. After completion of the curing process, the stator will be returned to normal atmospheric conditions. Final machining may be required to complete the stator (e.g., ends of the liner may need to be trimmed, ends of the stator may be threaded, etc.).

Figure 4:
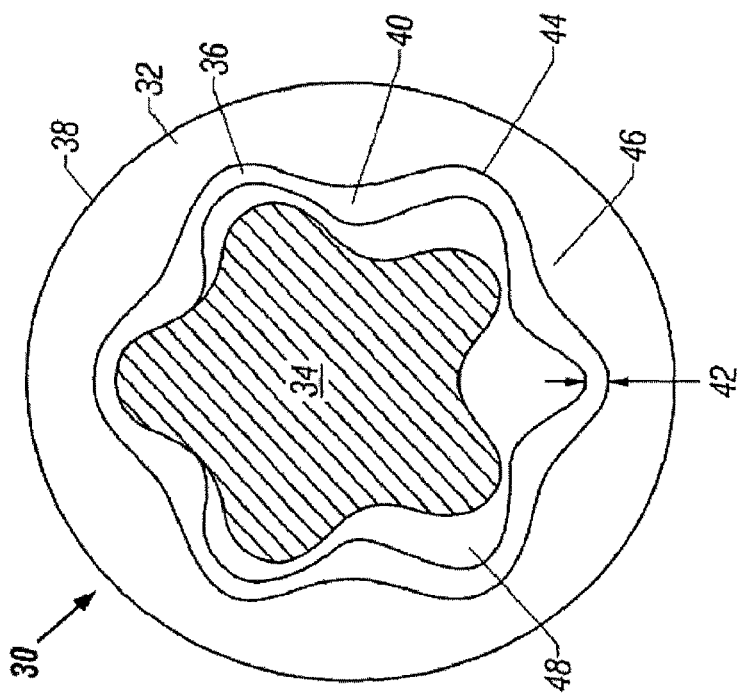
FIG. 4 shows a cross-sectional view of an assembled positive displacement motor according to embodiments disclosed herein, having an "even-wall" stator liner.

As illustrated in FIG. 2, liner 26 has a non-uniform thickness. In other embodiments, "even-wall" stators may be formed using fiber reinforced compositions disclosed herein, such as illustrated in FIG. 4. Positive displacement motor (PDM) 30 comprises a stator 32 and a rotor 34. The stator 32 comprises an external tube 38 that may be formed from, for example, steel or another material suitable for downhole use in a drilling environment. The stator also comprises a liner 36. The external tube 38 comprises a shaped inner surface 44 that comprises at least two lobes 46 formed thereon. The lobes 46 are helically formed along a selected length of the external tube 38 so that the lobes 46 define a helical pattern along the selected length. The helical form of the inner surface 44 generally corresponds to a desired shape for stator lobes. The liner 36 typically comprises at least two lobes 40, and a thickness 42 of the liner 36 may be either uniform or non-uniform throughout a cross-section thereof, and formed by injection molding, extrusion molding or other means followed by curing and finishing, as noted above. The lobes 40 (and the liner 36) are helically formed along a selected length of the external tube 38 such that the liner 36 conforms to the helically shaped inner surface 44 so that the at least two lobes 46 formed on the shaped inner surface 44 correspond to the lobes 40 formed in the liner 36. The external tube 38, including the inner surface 44, may be helically shaped by any means known in the art including machining, hydroforming, extrusion, and the like.

Stator liners according to embodiments disclosed herein may be formed from a fiber reinforced elastomeric or polymeric material. In other embodiments, stator liners may include a composite structure, such as an elastomeric layer and one or more fiber reinforced layers intermediate the external tube (housing) and the elastomeric outer layer. The intermediate fiber reinforced layer(s) may provide additional stiffness and/or wear resistance of the liner.

Stator liners, portions of stator liners, or reinforcing layers thereof, may be formed from a composition including:
  a. a curable or cross-linkable elastomeric or polymeric material, such as various elastomers, polymers, and other synthetic or natural materials known in the art;
  b. a fiber or fibrous material;
  c. a fiber dispersion compound; and
  d. carbon black.

The compositions used to form stator liners or portions thereof may also include plascticizers, curatives (i.e., curing or crosslinking agents), activators, processing aids, and waxes.

The curable elastomeric materials may include, for example, G.R.S., NEOPRENE, butyl and nitrile rubbers, fluorinated or perfluoro elastomers or rubbers, and soft PVC, among other polymers. In some embodiments, the elastomeric compound may include one or more of NBR, HNBR, FEPM, FKM, and FFKM.

In some embodiments, the elastomeric material may include a copolymerization product of 1,3-butadiene and acrylonitrile having a Mooney Viscosity ML(1+4) at 121° C. in the range from about 20 to about 120. The acrylonitrile content may be in the ranges from about 19 wt. % to about 49 wt. %, and the hydrogenation may be full or partial, leaving a residual double bond content from less than 1% to about 18%.

In other embodiments, the elastomeric material may be a copolymer of vinylidene fluoride and hexafluoropropylene having a Mooney Viscosity ML(1+10) at 100° C. in the range from about 10 to about 160. In some embodiments, the fluorine content of the elastomeric material may be in the range from about 60 to about 70%.

Elastomeric materials may also be a copolymer of vinylidene fluoride, hexafluoropropylene, and tetrafluoroethylene, with or without a cure site monomer, having a Mooney Viscosity ML(1+4) at 121° C. in the range from about 25 to about 65.

In other embodiments, the elastomeric material may be a copolymer of tetrafluoroethylene and propylene, with or without a cure site monomer, having a Mooney Viscosity ML(1+4) at 100° C. in the range from about 35 to about 160. In some embodiments, the fluorine content of the elastomeric material may be in the range from about 55 to about 65%.

The aforementioned polymers may be used alone or in combination with one or more additional polymers or grades of a similar polymer at a ratio in the range from about 20:80 to about 80:20.

The fiber or fibrous material may include at least one of carbon fibers, boron fibers, ceramic fibers, glass fibers, thermoplastic fibers, natural fiber, metallic fibers, synthetic fibers, and carbon nanotubes. For example, in some embodiments the fibers may include fibers made from E-glass, polyethylene PEI, PVDC, PTFE, PVDF, PVF, EFP, PEEK, PPS, and PEI. In some embodiments, the fiber or fibrous material may include aramid fibers, such as those sold under the mark "KEVLAR" (a mark of E.I. DuPont de Nemours of Wilmington, Del.).

Aramid fibers useful in some embodiments herein may have an average diameter in the range from about 0.5 to about 25 microns in some embodiments; from about 1 micron to about 20 microns in other embodiments; and from about 5 microns to about 15 microns, such as about 12 microns, in yet other embodiments. The fibers may have a length in the range from about 1 mm to about 50 mm in some embodiments; from about 5 mm to about 40 mm in other embodiments; and from about 10 mm to about 30 mm, such as about 20 mm, in yet other embodiments. Aramid fibers may have an aspect ratio (length to diameter) in the range from about 1:1 to about 300:1 in some embodiments, and from about 1:1 to about 200:1 in other embodiments. The aramid fibers may have a tensile strength of over 500,000 psi and be able to withstand temperatures of up to about 400° C.

In some embodiments, fiber reinforced stator liners, or the layers/portions of a stator liner that are fiber reinforced, may include up to about 2 wt % fiber, such as in the range from about 0.5 to about 1.8 phr, based on the total amount of elastomeric compound, in some embodiments, from about 1 to about 1.8 phr in other embodiments, and from about 1.25 to about 1.75 phr in yet other embodiments. In other embodiments, the fiber may be present in an amount from a lower limit of about 0.5, 0.6, 0.7, 0.8, 0.9, 1.0, 1.1, 1.2, 1.3, 1.4, 1.5, or 1.6 phr to an upper limit of about 1.2, 1.3, 1.4, 1.45, 1.5, 1.55, 1.6, 1.65, 1.7, 1.75, or 1.8 phr, where any lower limit may be combined with any upper limit.

While it has been proposed to add significantly greater quantities of fiber, such as 10 phr or greater, it has been found that incorporation of fibers in quantities less than about 1.8 phr, such as from about 1.5 to about 1.75 phr, may provide an optimal balance of significant improvements in physical properties, as well as excellent improvements in stator torque output capacity and stator endurance at high torque levels, with minimal negative impact on the compound resilience, elasticity, dispersity, and processability. It is theorized that greater quantities of fiber may result in discontinuities or imperfections in the elastomer matrix, possibly due to inefficient dispersion of the fiber at higher concentrations, which may result in little or no improvement in stator performance.

Fiber dispersion compounds are defined herein as compounds that facilitate the incorporation of the fiber with the elastomeric material, and may include solid dispersion compounds, liquid dispersion compounds, or combinations thereof. One example of a solid fiber dispersion compound useful in embodiments disclosed herein may include amorphous silicon dioxide. In some embodiments, amorphous silicon dioxide having an average particle size in the range from about 0.03 microns to about 0.3 microns (30 nm to 300 nm) and a surface area in the range from about 10 to about 30 $m^2/g$, such as about 20 $m^2/g$, may be used as a fiber dispersion compound. It is theorized that the relatively spherical amorphous silicon dioxide particles may provide a bearing effect and a viscosity-lowering effect on the resulting admixture of the fibers with the elastomeric material, allowing for improved processablity of the elastomeric mixture and improved dispersion of fibers throughout the resulting elastomeric matrix upon cure. Other solid fiber dispersion compounds, such as nano or micron sized spherical structures that may provide similar viscosity-reducing and bearing effects may also be used, and may include various natural and synthetic clays (alumina silicates, silica aluminates, etc.), magnesium silicates, coal dust, and/or silicon dioxide powder. Liquid dispersion compounds that may be useful in embodiments herein may include liquid polymers, waxes, and various processing aids or plasticizers.

In some embodiments, incorporation of the fiber into the curable composition mixture may be facilitated by use of a predispersion of fiber in a fiber dispersion compound. For example, a mixture of 5 wt. % to about 70 wt. % fiber in 95 wt. % to about 30 wt. % fiber dispersion compound may be admixed with an elastomeric material prior to injection or extrusion molding of the curable composition in a mold. In some embodiments, the fiber dispersion compound may be used in an amount ranging from about 0.5 to about 36 phr, such as from about 0.5 to about 15 phr in other embodiments. In other embodiments, the fiber dispersion compound may be present in an amount from a lower limit of about 0.5, 0.6, 0.7, 0.8, 0.9, 1.0, 1.1, 1.2, 1.3, 1.4, 1.5, 1.6, 1.7, or 2.0 phr to an upper limit of about 1.25, 1.5, 1.75, 2.0, 2.5, or 5 phr, where any lower limit may be combined with any upper limit.

In some embodiments, curable compositions useful for forming a stator liner or a portion/layer thereof may be formed by admixing:
  a. a curable or cross-linkable elastomeric or polymeric material, such as various elastomers, polymers, and other synthetic or natural materials known in the art;
  b. a fiber or fibrous material in an amount ranging from about 0.5 to about 1.8 phr (based on the total amount of component a) predispersed in a fiber dispersion compound (c);
  c. the fiber dispersion compound in an amount ranging from about 0.5 to about 36 phr;
  d. optionally, carbon black in an amount ranging from about 10 to about 100 phr;
  e. optionally, one or more curatives and/or activators, each in an amount ranging from about 1 to about 50 phr.

In other embodiments, curable compositions useful for forming a stator liner or a portion/layer thereof may be formed by admixing:
  a. a curable or cross-linkable elastomeric or polymeric material, such as various elastomers, polymers, and other synthetic or natural materials known in the art;
  b. an aramid fiber in an amount ranging from about 1 to about 1.8 phr (based on the total amount of component a) predispersed in amorphous silicon dioxide as fiber dispersion compound (c);
  c. amorphous silicon dioxide (fiber dispersion compound) in an amount ranging from about 1 to about 12 phr;
  d. carbon black in an amount ranging from about 10 to about 100 phr;
  e. optionally, one or more curatives and/or activators, each in an amount ranging from about 1 to about 50 phr.

The above described curable compositions may be formed using a screw mixer, a BANBURY mixer, a single or multiple screw extruder, or other mixing devices as known in the art for intimately mixing a polymeric or elastomeric resin material with one or more additive compounds. The mixing process may further provide heat, melting the polymeric or elastomeric resin material during the mixing process, and the resulting fluid mixture may then be extruded, injected, or otherwise disposed between a stator tube (housing) and a mold that has been placed therein. The liner material may then be cured and the stator finished (trimming, threading, etc.), as described above.

It has been found that the curable compositions according to various embodiments herein are processable using injection molding equipment (used in about 90% of the current stator manufacturing processes). Further, it has been found that the unique combination of fiber, fiber dispersion compounds, and carbon black allows for uniform fiber dispersion and pronounced property improvements to be achieved. A uniform fiber density is advantageous because it helps achieve, for example, uniform wear resistance throughout the thickness of the liner. A uniform fiber density is particular desirable proximate the lobes because the lobes experience the highest mechanical and thermal stresses. Additional support and wear resistance proximate the lobes help increase the longevity of the liner. Note that, in some embodiments, the liner thickness is at a maximum proximate the lobes, and a uniform fiber density supports and helps stiffen these regions so as to reduce deformation of the lobes caused by, for example, fluid pressure and contact with the rotor. Such results were heretofore unattainable with random fiber placement/orientation methods, as much higher fiber loadings were required to compensate for the agglomeration and non-uniformity of the fiber displacement, negatively impacting elongation properties, tear strength, compression set, and other dynamic properties affecting stator life and sealing performance. Additionally, the high fiber loadings typical of prior methods result in a compound viscosity spike and drastic changes to compound cure characteristics, making such mixtures unsuitable for some manufacturing processes, including injection molding processes. Embodiments of curable compounds disclosed herein overcome these deficiencies, resulting in an improved stator and a simplified manufacturing process.

As noted above, curable compositions disclosed herein may provide for improved processability using injection molding tooling. For example, NBR and other elastomeric compounds having a Mooney Viscosity ML(1+4) at 121° C. in the range from about 25 to about 40, and in some embodiments up to about 50, may be preferred when forming the stator via injection molding equipment typically used to produce stators having a length in the range from about 10 to about 25 feet (from about 3 to about 7.5 meters). Compositions useful with extrusion molding may include elastomeric compounds having a Mooney Viscosity ML(1+4) 100° C. in the range from about 25 to about 65, and in some embodiments up to about 80. Compositions useful with compression molding may include elastomeric compounds having a Mooney Viscosity ML(1+4) 100° C. in the range from about 25 to about 90, and in some embodiments up to about 120. Compositions useful with transfer molding may include elastomeric compounds having a Mooney Viscosity ML(1+4) 100° C. in the range from about 20 to about 45.

The above described stators may be used in a mud motor or drilling assembly used for the drilling of a wellbore through a subterranean formation. A lower end of the rotor may be coupled either directly or indirectly to, for example, a drill bit. In this manner, the PDM provides a drive mechanism for a drill bit independent of any rotational motion of a drill string generated proximate the surface of the well by, for example, rotation of a rotary table on a drilling rig. Accordingly, PDMs are especially useful in drilling directional wells where a drill bit is connected to a lower end of a bottom hole assembly (BHA). The BHA may include, for example, a PDM, a transmission assembly, a bent housing assembly, a bearing section, and the drill bit. The rotor may transmit torque to the drill bit via a drive shaft or a series of drive shafts that are operatively coupled to the rotor and to the drill bit. In operation, a drilling fluid is passed through the mud motor assembly, eccentrically rotating the rotor as the drilling fluid passes through the progressive cavity motor. The motor output shaft transmits the eccentric rotor motion (and torque) to the concentrically rotating drill bit to drill the formation.

EXAMPLES

TABLE 1

|  | Formula 1 (comparative) | Formula 2 | Formula 3 (comparative) |
| --- | --- | --- | --- |
| Polymer | 100 | 100 | 100 |
| Carbon Black | 90 | 90 | 75 |
| Plasticizer | 20 | 20 | 20 |
| 40% Fiber predispersion | 0 | 4 | 15 |
| Curatives | 5.5 | 5.5 | 5.5 |
| Activators | 11 | 11 | 11 |
| Total | 226.5 | 230.5 | 226.5 |

TABLE 2

|  | Formula 1 | Formula 2 | Formula 3 |
| --- | --- | --- | --- |
| ASTM D412-06 |  |  |  |
| Tensile (psi) | 2100 | 1900 | 1300 |
| Elongation (%) | 300 | 250 | 70 |
| Mod at 25% | 200 | 800 | 800 |
| ASTM D624-00 Tear Die C Tstrength (lbf/in) | 260 | 230 | 230 |
| Tstrength (lbf/in) after 72 hr water immersion at 300 F. | 200 | 220 |  |
| ASTM D395 (22 hrs at 250 F.) | 35 | 37 | 65 |

TABLE 2-continued

|  | Formula 1 | Formula 2 | Formula 3 |
| --- | --- | --- | --- |
| Compression Set % |  |  |  |
| ASTM D429 90 degree Adhesion Peel (lbf/in) | 90 | 120 |  |
| Adhesion Peel (lbf/in) after 72 hr water immersion at 300 F. | 15 | 30 |  |
| RPA (30 mins at 300 F.) |  |  |  |
| ML | 0.29 | 0.29 |  |
| MH | 15 | 15 |  |

Table 1 is a side-by-side formulation comparison, on the basis of adding the fibers into the same formulation with equal total phrs, Formula 1 (comparative example, typical of commercially available stators) has no fibers, Formula 3 (comparative example) has about 6 phr aramid fiber (predispersed in amorphous silicon dioxide); and Formula 2 (according to embodiments herein), includes about 1.6 to 1.7 phr aramid fibers (predispersed in amorphous silicon dioxide). Table 2 compares the physical properties of the resulting materials upon cure. The stiffness improvement, over the comparative example without fibers, in 25% modulus is around 400% while other properties show minimal change, such as elongation, compression set, and ML. This is due to excellent uniformity of fiber dispersion obtained by the current method and the optimal fiber phrs so that fiber achieves a synergistic interaction with the carbon black at a very low loading of 1.7 phr to boost the modulus. The disadvantage of high fiber loading is apparent in formula 3 that the compound has a dramatic loss of elongation and compression set values goes up significantly. On the other hand, the low loading of fiber thereby renders minimal impact to other properties. Further, the fiber is high in surface area and high in aspect, which increases the interaction between fiber/CB and polymer matrix, giving rise to an enhanced high temperature performance and high bond strength between the rubber and adhesive.

Figure 6:
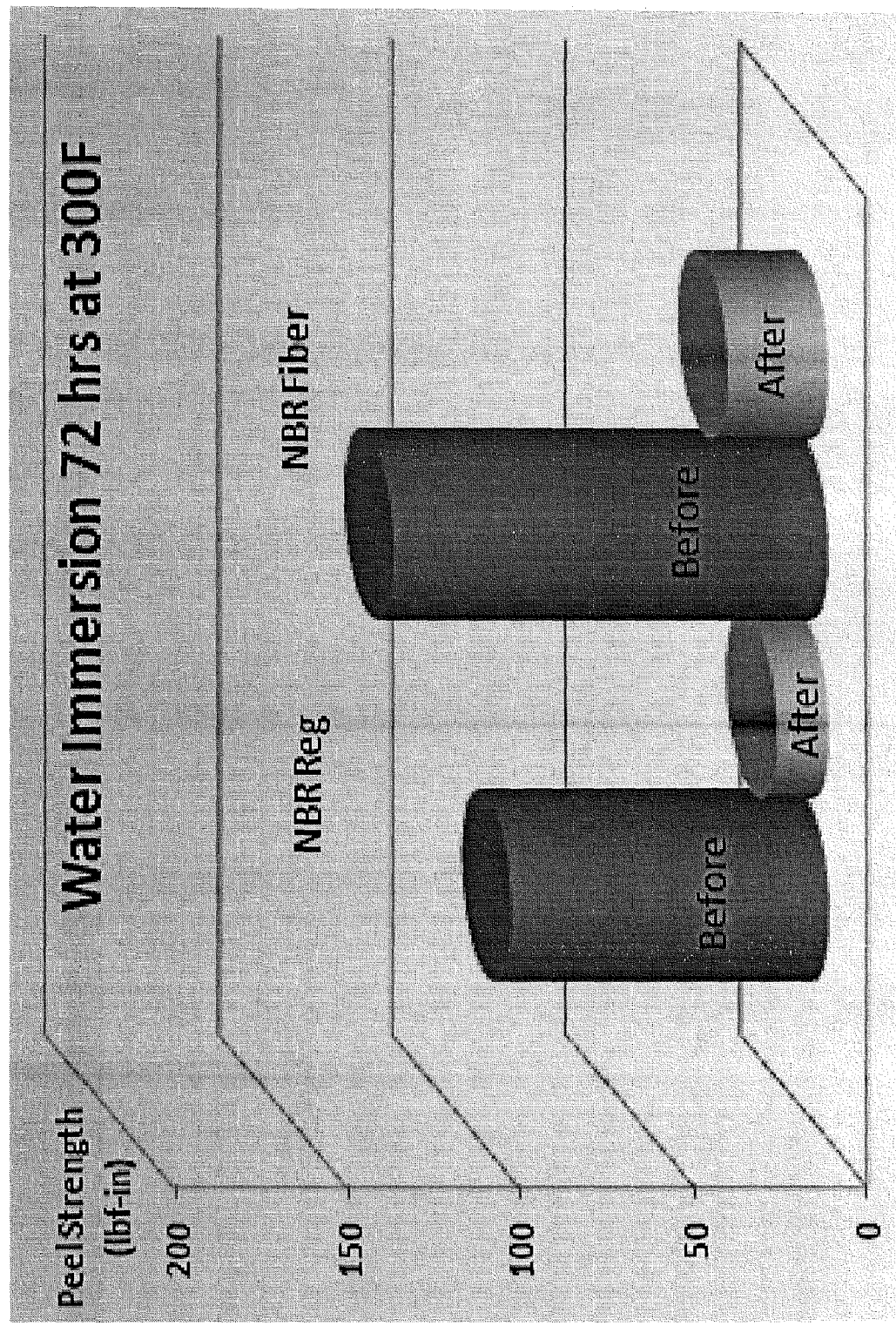
Figure 7:
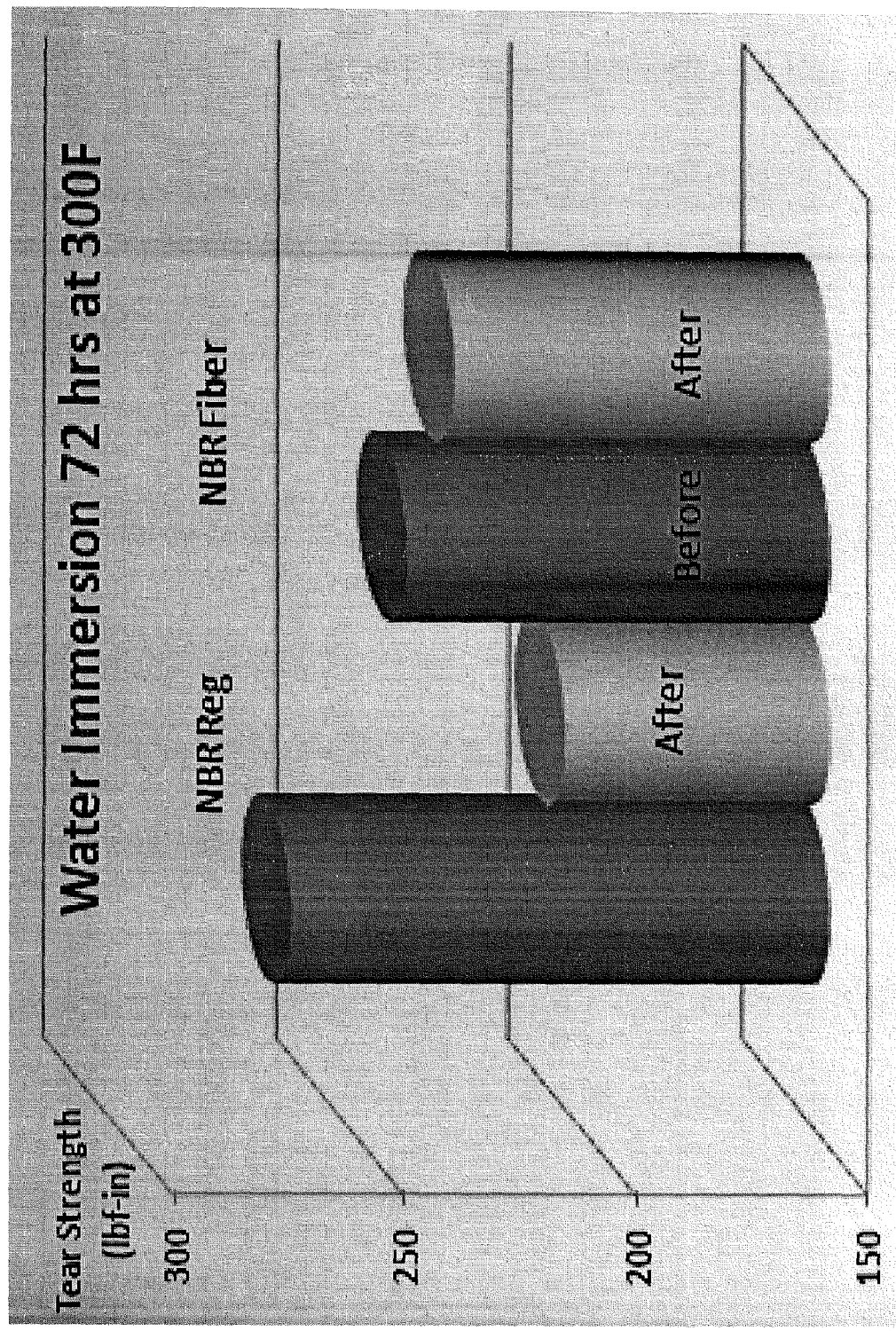

FIGS. 5 through 8 graphically compare the physical properties of the composition of Formula 1 (comparative) to that of Formula 2. As noted above and illustrated in FIG. 5, the 25% modulus for the cured composition based on Formula 2 is significantly greater than that for Formula 1 (greater than 800 psi vs. less than 200 psi). FIGS. 6 and 7 illustrate the differences in peel strength and tear strength, both prior to and subsequent to immersion in water at 300° F. for 72 hours, simulating downhole operating conditions. With regard to peel strength, Formula 2 showed improvements both before and after immersion. Tear strength for Formula 2 was less than that for Formula 1 before immersion, but under simulated downhole conditions showed marked improvement as compared to Formula 1.

Figure 8:
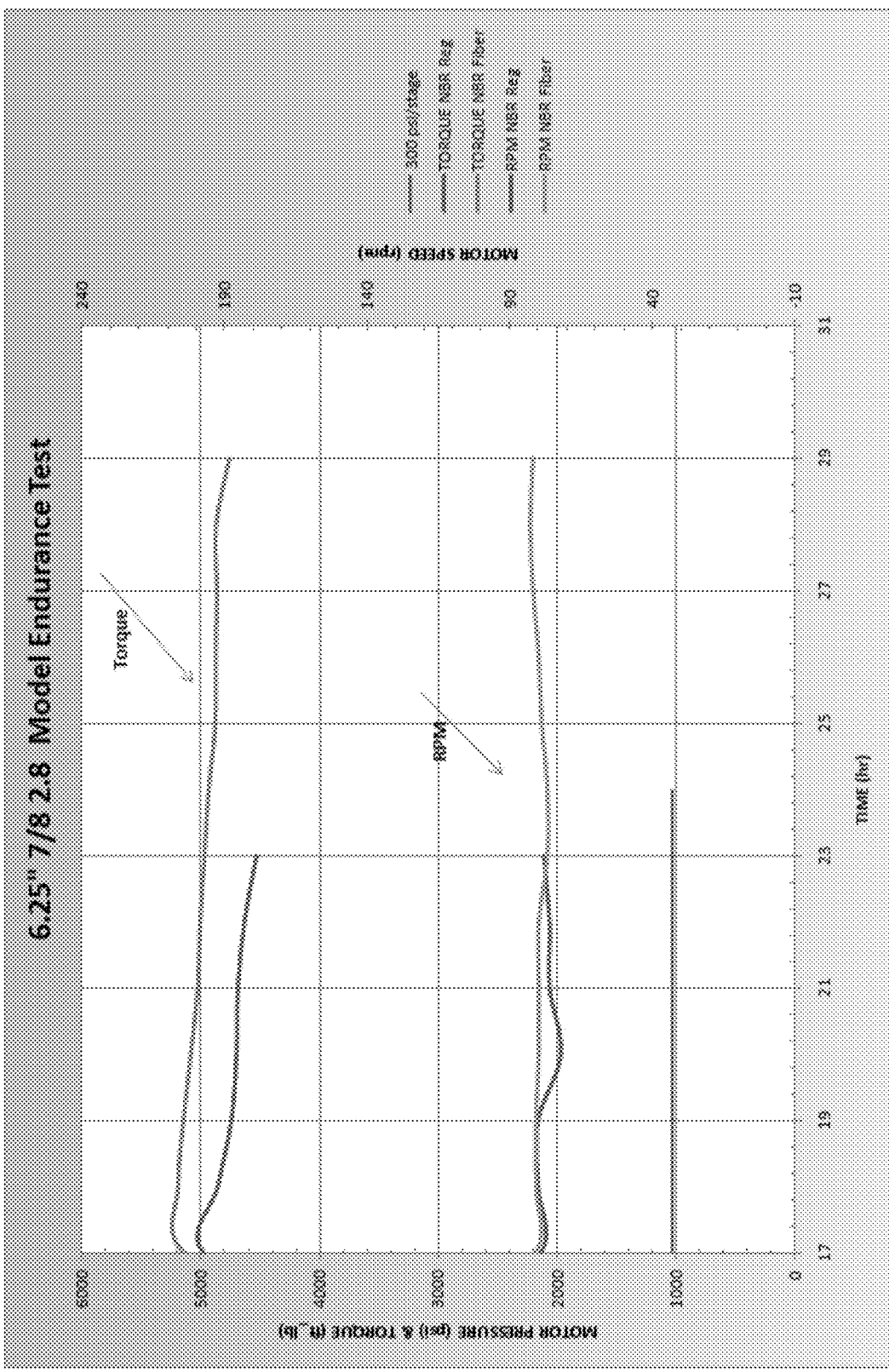

FIG. 8 compares stator performance for stators formed from Formula 1 (NBR reg) and Formula 2 (NBR Fiber). The performance test was performed on a 6.25 inch long section of a stator having an external diameter of ⅞ inch using a simulated drilling fluid. The stators were formed using the same mold and tested under the same test procedure. The pressure drop of the test stator was set to 300 psi per stage after the warm-up and initial tests and the motor output (rpm and torque) were measured over time. The test was stopped upon failure of the stator. The rpm of the stators was roughly equivalent, which is expected based upon the differential pressure per stage. The initial torque output for the stator with fiber (Formula 2) was greater and decreased at a slower rate over time. Endurance of the stator based on Formula 2 was significantly greater, as shown on the graph. Further, filtering of the stator effluent drilling fluid during testing showed significantly less chunking and flaking of polymeric material from the stator of Formula 2 as compared to the stator of Formula 1.

As described above, embodiments disclosed herein provide for a novel method for uniformly dispersing fibers in an elastomeric matrix. In addition to the above noted advantages with respect to uniform fiber density, improved processability in the manufacture of stators, embodiments disclosed herein may also provide for mud motors having improved durability and/or power generation. For example, the fibers may serve to strengthen and stiffen the elastomer of the stator so that it is better able to withstand a certain amount of degradation in properties without failure or chunking and can operate with less interference with the rotor without leakage.

In addition to stator manufacture, compositions disclosed herein may also be useful for manufacturing fiber reinforced seals and other fiber reinforced oilfield equipment. For example, the benefits realized by use of a fiber predispersion, such as a mixture of aramid fibers in amorphous silicon dioxide, may improve the manufacturing process and/or resulting properties of seals and other fiber reinforced oilfield equipment. The effective dispersion and synergistic effects realized with the fiber and fiber dispersion compound in combination with carbon black may also benefit various fiber reinforced oilfield equipment. Accordingly, seals, stator liners, and other oilfield products or portions or reinforcing layers thereof, may be formed from according to embodiments disclosed herein using a composition including:
  a. a curable or cross-linkable elastomeric or polymeric material, such as various elastomers, polymers, and other synthetic or natural materials known in the art;
  b. a fiber or fibrous material;
  c. a fiber dispersion compound; and
  d. optionally carbon black.

The compositions used to form seals and other oilfield product or portions/layers thereof may also include plasticizers, curatives (i.e., curing or crosslinking agents), activators, processing aids, and waxes.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A positive displacement drilling motor comprising:
  a rotor deployed in a stator, the rotor configured to rotate eccentrically in the stator when drilling fluid passes through the motor;
  wherein the stator comprises an elastomeric stator liner deployed in a stator tube, the elastomeric stator liner comprising:
    a curable elastomer;
    from about 1.25 to about 1.75 phr aramid fibers;
    from about 0.5 to about 15 phr amorphous silicon dioxide having a surface area in a range from about 10 $m^2/g$ to about 30 $m^2/g$; and
    from about 10 to about 100 phr carbon black;
    wherein phr is defined as parts per hundred parts of the curable elastomer, and wherein the aramid fibers are dispersed through the curable elastomer.

2. The drilling motor of claim 1, wherein the elastomeric stator liner comprises from about 1.5 to about 1.75 phr aramid fibers.

3. The drilling motor of claim 1, wherein the amorphous silicon dioxide is spherical.

4. The drilling motor of claim 1, wherein the amorphous silicon dioxide has an average particle size in a range from about 30 nm to about 300 nm.

5. The drilling motor of claim 1, wherein the curable elastomer comprises at least one of nitrile butadiene rubber (NBR), hydrogenated nitrile butadiene rubber (HNBR), fluoroelastomer (FKM), fluoro ethylene/propylene rubbers (FEPM), and perfluoroelastomers (FFKM).

6. The drilling motor of claim 1, wherein the curable elastomer comprises at least one of NBR or HNBR and has a Mooney Viscosity (ML(1+4) at 121° C.) in a range from about 20 to about 120.

7. The drilling motor of claim 1, wherein the elastomeric stator liner further comprises one or more curatives and/or activators, each in an amount ranging from about 1 to about 50 phr.

8. A positive displacement drilling motor comprising:
  a rotor deployed in a stator, the rotor configured to rotate eccentrically in the stator when drilling fluid passes through the motor;
  wherein the stator comprises an elastomeric stator liner deployed in a stator tube, the elastomeric stator liner comprising:
    a curable elastomer;
    from about 0.5 to about 1.8 phr fibrous material;
    from about 0.5 to about 36 phr silicon dioxide; and
    from about 10 to about 100 phr carbon black;
    wherein phr is defined as parts per hundred parts of the curable elastomer, and wherein the silicon dioxide has a surface area in a range from about 10 $m^2/g$ to about 30 $m^2/g$.

9. The drilling motor of claim 8, wherein the silicon dioxide has an average particle size in a range from about 30 nm to about 300 nm.

10. The drilling motor of claim 8, wherein the silicon dioxide is an amorphous silicon dioxide.

11. The drilling motor of claim 8, wherein the elastomeric stator liner comprises from about 0.5 to about 15 phr of the silicon dioxide.

12. The drilling motor of claim 8, wherein the fibrous material comprises an aramid fiber.

13. The drilling motor of claim 8, wherein the fibrous material of the elastomeric stator liner comprises an aramid fiber in an amount of from about 1 to about 1.8 phr.

14. The drilling motor of claim 8, wherein the curable elastomer comprises at least one of nitrile butadiene rubber (NBR), hydrogenated nitrile butadiene rubber (HNBR), fluoroelastomer (FKM), fluoro ethylene/propylene rubbers (FEPM), or perfluoroelastomers (FFKM).

15. The drilling motor of claim 14, wherein the curable elastomer comprises at least one of NBR or HNBR and has a Mooney Viscosity (ML(1+4) at 121° C.) in a range from about 20 to about 120.

16. A drilling assembly comprising:
  the positive displacement drilling motor of claim 1;
  a motor output shaft directly or indirectly connected to the rotor; and
  a drill bit directly or indirectly connected to the motor output shaft.

* * * * *